United States Patent
Grossman et al.

[11] 3,898,125
[45] Aug. 5, 1975

[54] NUCLEAR FUEL ELEMENT CONTAINING STRIPS OF AN ALLOYED Zr, Ti AND Ni GETTER MATERIAL

[75] Inventors: Leonard N. Grossman, Livermore; Douglas R. Packard, Sunol, both of Calif.

[73] Assignee: General Electric Company, San Jose, Calif.

[22] Filed: Dec. 8, 1971

[21] Appl. No.: 205,790

[52] U.S. Cl. .............. 176/68; 176/38; 252/181.2; 252/181.6
[51] Int. Cl. .............. G21c 3/18; H01j 7/18
[58] Field of Search .............. 176/68, 76, 79, 38; 252/181.5, 181.6, 472, 181.2, 181.1; 75/177; 23/355; 29/473.3

[56] References Cited
UNITED STATES PATENTS

| | | | |
|---|---|---|---|
| 1,151,160 | 8/1915 | Brown et al. | 75/177 |
| 2,242,101 | 5/1941 | Atlee | 252/181.2 |
| 3,082,174 | 3/1963 | Perdijk et al. | 252/181.6 |
| 3,141,830 | 7/1964 | Klepfer et al. | 176/68 |
| 3,319,107 | 5/1967 | Williams | 252/181.2 |
| 3,378,458 | 4/1968 | Ross et al. | 176/68 X |
| 3,519,537 | 7/1970 | Ferrari | 176/68 |

FOREIGN PATENTS OR APPLICATIONS
670,692 9/1963 Canada .............. 252/181.6

OTHER PUBLICATIONS

Zaimovski et al., *Effects of Impurities and Alloying Elements on Zirconium . . .,* Oct. 1966, Nuclear Sci. Abst. No. 21659.
*Nuclear Science Abstracts,* Vol. 22, No. 11, Abstract No. 21659, Zaimovski et al., June 15, 1968, p. 2244.

*Primary Examiner*—Carl D. Quarforth
*Assistant Examiner*—Roger S. Gaither
*Attorney, Agent, or Firm*—Ivor J. James, Jr.; Samuel E. Turner; Sam E. Laub

[57] ABSTRACT

A nuclear fuel element for use in the core of nuclear reactor is disclosed. The nuclear fuel element has disposed therein an alloy having the essential components of nickel, titanium and zirconium, and the alloy reacts with water, water vapor and reactive gases at reactor ambient temperatures. The alloy is disposed in the plenum of the fuel element in the form of strips and preferably the strips are positioned inside a helical member in the plenum. The position of the alloy strips permits gases and liquids entering the plenum to contact and react with the alloy strips.

18 Claims, 2 Drawing Figures

PATENTED AUG 5 1975

3,898,125

INVENTORS:
LEONARD N. GROSSMAN
DOUGLAS R. PACKARD
BY: [signature]
ATTORNEY

3,898,125

NUCLEAR FUEL ELEMENT CONTAINING STRIPS OF AN ALLOYED Zr, Ti, AND Ni GETTER MATERIAL

BACKGROUND OF THE INVENTION

This invention relates broadly to an improvement in nuclear fuel elements for use in the core of nuclear fission reactors, and more particularly to improved nuclear fuel elements having an alloy with the essential components of nickel, titanium and zirconium positioned in the plenum of the fuel element and capable of reacting with water, water vapor and reactive gases.

Nuclear reactors are presently being designed, constructed and operated in which the nuclear fuel is contained in fuel elements which may have various geometric shapes, such as plates, tubes, or rods. The fuel material is usually enclosed in a corrosion-resistant, non-reactive, heat conductive container or cladding. The elements are assembled together in a lattice at fixed distances from each other in a coolant flow channel or region forming a fuel assembly, and sufficient fuel assemblies are combined to form the nuclear fission chain reacting assembly or reactor core capable of a self-sustained fission reaction. The core in turn is enclosed within a reactor vessel through which a coolant is passed.

The cladding serves two primary purposes: first, to prevent contact and chemical reactions between the nuclear fuel and either the coolant or moderator if present, or both; and second, to prevent the radioactive fission products, some of which are gases, from being released from the fuel into the coolant or moderator or both. Common cladding materials are stainless steel, aluminum and its alloys, zirconium and its alloys, niobium (columbium), certain magnesium alloys, and others. The failure of the cladding, due to the build-up of gas pressure or other reasons, can contaminate the coolant or moderator and the associated systems with radioactive long-lived products to a degree which interferes with plant operation.

Problems have been encountered in the manufacture and in the operation of nuclear fuel elements which employ certain metals and alloys as the clad material due to the reactivity of these materials under certain circumstances. Zirconium and its alloys, under normal circumstances, are excellent materials as a nuclear fuel cladding since they have low neutron absorption cross sections and at temperature below about 600°F are extremely stable and non-reactive in the presence of demineralized water or steam which are commonly used as reactor coolants and moderators. Within the confines of a sealed fuel rod, however, the hydrogen gas generated by the slow reaction between the cladding and residual water may build up to levels which under certain conditions can result in localized hydriding of the zirconium alloy with concurrent deterioration in the mechanical properties of the cladding. The cladding is also adversely affected by such gases as oxygen, nitrogen, carbon monoxide and carbon dioxide at all temperatures.

The zirconium cladding of a nuclear fuel element is exposed to one or more of the gases given above during irradiation in a nuclear reactor in spite of the fact that these gases may not be present in the reactor coolant or moderator, and further may have been excluded as far as possible from the ambient atmosphere during manufacture of the cladding and the fuel element. Sintered refractory and ceramic compositions, such as uranium dioxide and others used as nuclear fuel, release measurable quantities of the aforementioned gases upon heating, such as during fuel element manufacture and especially during irradiation. Particulate refractory and ceramic compositions, such as uranium dioxide powder and other powders used as nuclear fuel, have been known to release even larger quantities of the aforementioned gases during irradiation. These gases react with zirconium clad material containing the nuclear fuel. This reaction can result in the embrittlement of the cladding which endangers the integrity of the fuel element. Although water and water vapor may not react directly to produce this result, at high temperatures water vapor does react with zirconium and zirconium alloys to produce hydrogen and this gas further reacts locally with the zirconium and zirconium alloys to cause embrittlement. These undesirable results are exaggerated by the release of these residual gases within the sealed metal-clad fuel element since it increases the internal pressure within the element and thus introduces stresses in the presence of corrosive conditions not anticipated in the original design of the clad tube.

In light of the foregoing, it has been found desirable to minimize water, water vapor and gases reactive with the cladding from the interior of the cladding throughout the time the nuclear fuel is used in the operation of nuclear power plants. One such approach has been to find materials which will chemically react rapidly with the water, water vapor and other gases to eliminate these from the interior of the cladding, which materials are called getters. While several getters for water and water vapor have been found, such as the zirconium-titanium getter set forth in U.S. Pat. No. 2,926,981, it has remained desirable to develop a getter having equal or even greater rapidity of reaction with moisture and gases, and having the additional feature of producing negligible hydrogen gas during the reaction with moisture.

A getter in the form of an alloy which rapidly reacts stoichiometrically with water, water vapor and reactive gases has been developed and is described in copending U.S. patent application Ser. No. 74,471 (now abandoned) entitled Alloys for Gettering Moisture and Reactive Gases, filed Sept. 22, 1970 in the names of L. N. Grossman and D. R. Packard. The foregoing application is assigned to the same assignee as the present application and the foregoing application is hereby incorporated by reference. The invention embodied in the foregoing patent application covers alloys reacting with water, water vapor and reactive gases at temperatures in the range of about 200° to about 650°C. The alloys have the essential components of zirconium, nickel and titanium and particularly those alloys containing from about 3 to about 12 weight percent nickel and from about 3 to about 30 weight percent titanium with the balance being zirconium.

SUMMARY OF THE INVENTION

An improved nuclear fuel element includes a getter of a ternary alloy having the essential components of zirconium, nickel and titanium disposed in the plenum portion of the nuclear fuel element in the form of thin strips or foils. The getter strips are preferably disposed and held in a helical member in the plenum and this physically restrains the getter alloy strips and reaction products of the getter alloy strips from free movement within the fuel element. The getter strips are disposed in one of the coolest locations in the fuel element during operation, and this location substantially eliminates any reversal of the gettering reaction of the alloy with water, water vapor and reactive gases. The getter effectively reacts with water, water vapor and gases reactive with the cladding of a nuclear fuel element at operating temperature. The foregoing arrangement of a nuclear fuel element utilizes the gettering properties of the ternary alloy as the position and physical form of the alloy in the plenum allows water, water vapor and gases reactive with the cladding to be drawn from the fuel element to the alloy.

OBJECTS OF THE INVENTION

It is an object of this invention to provide an improved nuclear fuel element having a getter comprising a ternary alloy of zirconium, nickel and titanium located in a low temperature region of a nuclear fuel element.

Another object of this invention is to provide an efficient physical embodiment of a getter comprising a ternary alloy of zirconium, nickel and titanium in a nuclear fuel element in a form suitable for rapid reaction with water, water vapor and reactive gases.

Still another object of this invention is to provide an improved method for the manufacture of metallic clad nuclear fuel elements which include a getter of a ternary alloy disposed in the fuel element for efficient protection of the fuel element.

A further object of this invention is to provide a nuclear fuel element with a getter of a ternary alloy in which moisture and reactive gases will be drawn into contact with the getter to promote reaction with the getter resulting in the formation of solid innocuous reaction products.

Still another object of this invention is to provide a nuclear fuel element incorporating a getter of a ternary alloy in the form of strips in an assembly restraining the getter and reaction products of the getter from free movement within the fuel element.

Another object of this invention is to provide a nuclear fuel element design which includes a getter of a ternary alloy located in a low temperature region of the fuel element.

A further object of the invention is to provide a nuclear fuel element having a getter of a ternary alloy in the form of strips or foils located in the plenum of the fuel element, and preferably held by the helical member in the plenum.

The foregoing and other objects of this invention will become apparent to a person skilled in the art from reading the following specification and the appended claims with reference to the accompanying drawings described immediately hereinafter.

DESCRIPTION OF THE INVENTION

Figure 1:
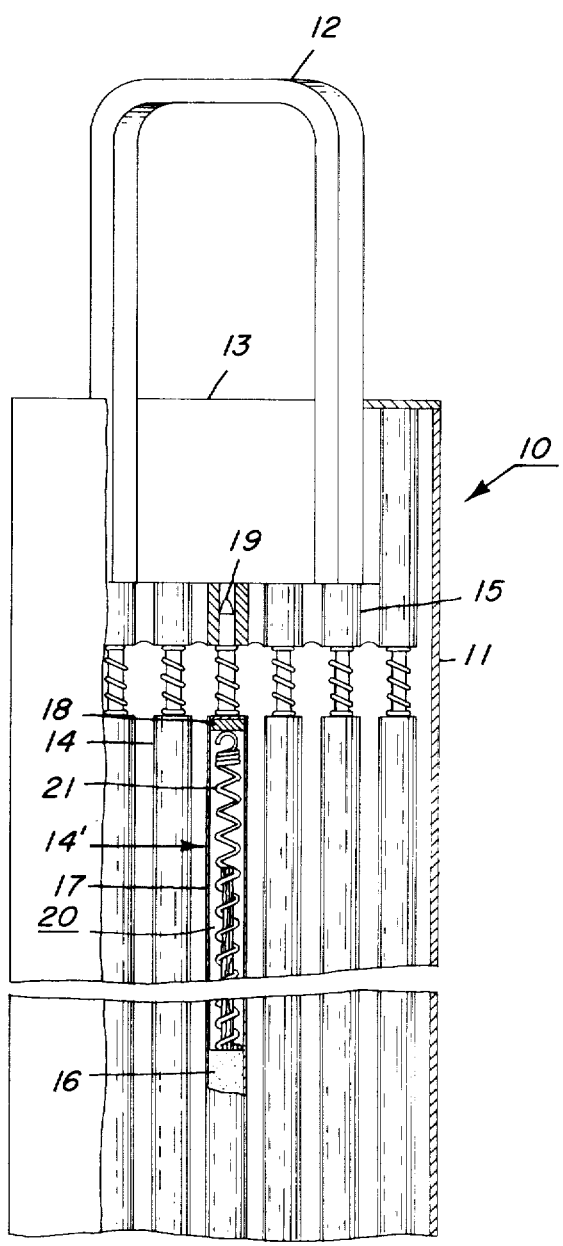
FIG. 1 presents a partial sectional view of a nuclear fuel assembly containing nuclear fuel elements constructed according to the teachings of this invention with one element shown in partial sectional view.

Referring now more particularly to FIG. 1, there is shown a partially cutaway sectional view of a nuclear fuel assembly 10. This fuel assembly consists of a tubular flow channel 11 of square cross section provided at its upper end with lifting bale 12 and at its lower end with a nose piece (not shown due to the lower portion of assembly 10 being omitted). The upper end of channel 11 is open at 13 and the lower end of the nose piece is provided with coolant flow openings. An array of fuel elements 14 is enclosed in channel 11 and supported therein by means of upper end plate 15 and a lower end plate (not shown due to the lower portion being omitted). The liquid coolant ordinarily enters through the openings in the lower end of the nose piece, passes upwardly around fuel elements 14, and discharges at upper outlet 13 in a partially vaporized condition for boiling reactors or in an unvaporized condition for pressurized reactors at elevated temperatures.

Figure 2:
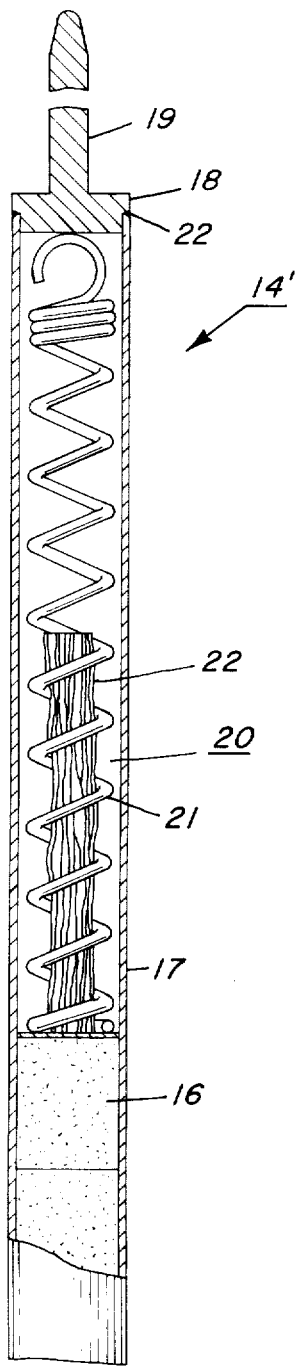
FIG. 2 shows a cutaway view of the plenum portion of the nuclear fuel element illustrating the location of the getter in the form of thin strips or foils grouped inside a helical member in the plenum.

Referring now to FIG. 2 in addition to FIG. 1, a nuclear fuel element or rod 14' is shown in partial sectional view constructed in accordance with the teaching of this invention. The fuel element includes fuel material 16, here shown as a plurality of fuel pellets of fissionable and/or fertile material positioned within a structural cladding or container 17. In some cases, the fuel pellets may be of various shapes; in other cases different fuel forms such as particulate fuel may be used. The physical form of the fuel is immaterial to this invention. Various nuclear fuel materials may be used including uranium compounds, plutonium compounds, thorium compounds and mixtures thereof. A preferred fuel is uranium dioxide or a mixture comprising uranium dioxide and plutonium dioxide. The container is sealed at its ends by means of end plugs 18 which may include studs 19 to facilitate the mounting of the fuel rod in the assembly. A void space or plenum 20 is provided at one end of the fuel element to permit longitudinal expansion of the fuel material and accumulation of gases released from the fuel material. A helical member 21 is positioned within space 20 ultimately to provide internal support for that part of the cladding 17 surrounding space 20 and which is not otherwise supported against the external pressure of the moderator-coolant fluids. The helical member also serves to maintain the position of the fuel during handling and transportation of the fuel elements. Cladding 17 is secured to end plugs 18 by means of circumferential welds 22.

The fuel element provides an excellent thermal contact between the fuel cladding and the fuel material, a minimum of parasitic neutron absorption and resistance to bowing and vibration which is occasionally caused by flow of the coolant at high velocity.

Referring now to FIG. 2, there is positioned preferably inside helical member 21 in the plenum 20 a multiplicity of strips or foils 23, preferably thin strips, of a getter of a ternary alloy of zirconium, nickel and titanium. The strips are disposed in plenum 20 permitting gases entering and liquids condensed in the plenum to contact the strips. The strips constitute a physical form having a high surface area to volume ratio and thus expose the surface area of the getter efficiently to react with the gases and liquids entering plenum 20. The strips are preferably rectangular in shape having preferred dimensions of about 5 to about 10 mils in thickness, about one-eighth to about one-fourth inch in width and a length of about 3 to about 4 inches. Generally about eight to about 10 or more strips of getter are disposed in the plenum which constitutes about 10 to about 12 grams of alloy in a fuel rod containing about 5 kilograms of nuclear fuel material. Larger quantities of getter are used in powder fuel rods and in fuel rods suspected of containing large amounts of deleterious gases.

The getter used in the nuclear fuel element of this invention and its properties will not be described in detail.

It has been discovered that a material suitable for controlling moisture and other reactive gases by chemically combining with such gaseous materials, herein called a "getter," should have a combination of properties. One desirable property is the minimization of any free hydrogen after the chemical reaction of the getter with water, in order to prevent hydride failures of cladding associated with the getter. Thus the getter should react approximately stoichiometrically with the water and water vapor (both herein called water) and in such a way that there is a negligible net source of hydrogen from the reaction. The getter should also rapidly react with the water at the temperatures prevailing in the system in which the getter is utilized, which would be in the range of about 200° to about 650°C for a preferred application of the getter. The getter should also have a low neutron cross section and be inexpensive to fabricate. Preferably the getter should also have the property of reacting with other reactive gases such as carbon monoxide, carbon dioxide, oxygen and nitrogen, and hydrogen-containing compounds such as hydrocarbons.

The foregoing properties are embodied in a class of alloys having the essential components zirconium, nickel and titanium, particularly those alloys containing from about 3 to about 12 weight percent nickel, from about 3 to about 30 weight percent titanium with the balance being zirconium. The alloys can be classified as zirconium base alloys and the composition ranges given above produce alloys having at least about 0.5 volume percent of an intermetallic nickel-containing phase. Representative of the intermetallic nickel-containing phases in the alloy are typically $NiZr_2$ and $Ni(0.9\ Zr,\ 0.1\ Ti)_2$. The alloys have a metallic appearance and metallographic examination shows the alloys are medium grained having an average grain size of about 10 microns.

Particularly preferred compositions of the ternary alloys of this invention are the following:
a. 10 weight percent titanium, 5 weight percent nickel and the balance zirconium,
b. 11 weight percent titanium, 4 weight percent nickel and the balance zirconium, and
c. 11 weight percent titanium, 12 weight percent nickel and the balance zirconium.

The impurity content of the alloys is not critical to the development of the foregoing getter properties and substantial amounts of impurities can be included in the fabricated alloys as long as the surface of the alloys has the zirconium-nickel-titanium ternary effectively exposed for reaction. In practice it has been discovered that oxygen contents up to several thousand parts per million in the alloys are tolerable. Nitrogen contents up to about 750 parts per million are tolerable and even desirable in utilization of the alloys as moisture getters. The other impurities found in the ternary alloys of this invention which do not hinder use of the alloys as getters include hydrogen and carbon. Metallic impurities found in the alloy which do not hinder use of the alloys as getters are hafnium in amounts up to about 10,000 parts per million, iron in amounts up to about 1,100 parts per million and chromium in amounts up to about 1,000 parts per million. The fact that the impurity content of the alloys is not critical to the utilization of the alloys as moisture getters enables fabrication of the alloy from low-grade components of nickel, titanium and zirconium having impurity contents. An example would be using impure zirconium available from a zirconium production facility for the cost advantage over highly refined zirconium. The utilization of the alloys of this invention in nuclear applications may necessitate control of high neutron absorption cross section impurities in the alloys.

The alloys referred to above have the property of reacting with water and water vapor for long time periods at a rapid rate of reaction over a temperature range of about 200° to about 650°C without becoming passive. One measured rate of reaction with water vapor at about 15 torr was about 1 to about 2 micrograms/-square centimeter of surface area per minute at about 300°C. The long term reaction data with water were obtained by heating alloy specimens in contact with water vapor, and the alloy exhibited no passivity for periods of greater than 30 hours. During reaction with water, the alloys allow substantially no release of hydrogen for weight gains up to about 6 percent of the initial getter weight so cladding used in association with the getters mentioned above would be exposed to substantially no hydrogen thereby eliminating formation of metallic hydrides which ultimately lead to failures of the metallic materials. This minimum release of hydrogen during the reaction of the alloys with water indicates a substantially stoichiometric reaction of the alloys with water. Studies indicate that the alloys used in this invention readily react with hydrogen over a temperature range of about 200° to about 650°C so that the alloys used in this invention are efficient hydrogen getters. The alloys also react with hydrogen-containing compounds such as some hydrocarbons and with other gases such as nitrogen, carbon dioxide, carbon monoxide and oxygen. Since the alloys are zirconium base alloys the alloys have a low neutron cross section required for use in nuclear applications when the impurities having high neutron cross section are acceptably minimized. The alloys can be readily fabricated into shapes having high surface area such as thin sheets.

As will be apparent to those skilled in the art, various modifications and changes may be made in the invention described herein. It is accordingly the intention that the invention be construed in the broadest manner within the spirit and scope as set forth in the accompanying claims.

What is claimed is:

1. A nuclear fuel element which comprises an elongated container, a body of nuclear fuel material disposed in and partially filling said container and forming an internal cavity, an end closure integrally secured and sealed at each end of said container, a fuel material restraining member positioned in said cavity and a multiplicity of strips comprised of a ternary alloy positioned in said cavity, the fuel material restraining member is a helical member and the multiplicity of strips are disposed within the helical member in said cavity, the alloy being comprised of from about 3 to about 12 weight percent nickel, of greater than 3 to about 30 weight percent titanium and the balance is zirconium, and the alloy being a gettering material for water, water vapor and reactive gases.

2. A nuclear fuel element of claim 1 in which the nuclear fuel material is a mixture comprised of uranium dioxide and plutonium dioxide.

3. A nuclear fuel element of claim 1 in which the strips have dimensions of about 5 to about 10 mils in thickness, about one-eighth to one-fourth inch in width and a length of about 3 to about 4 inches.

4. A nuclear fuel element of claim 1 in which the ternary alloy has an intermetallic nickel-containing phase.

5. A nuclear fuel element of claim 1 in which the ternary alloy is comprised of about 4 weight percent nickel, about 11 weight percent titanium and the balance is zirconium.

6. A nuclear fuel element of claim 1 in which the ternary alloy is comprised of about 12 weight percent nickel, about 11 weight percent titanium and the balance is zirconium.

7. A nuclear fuel element of claim 1 in which the ternary alloy is comprised of about 5 weight percent nickel, 10 weight percent titanium and the balance is zirconium.

8. A nuclear fuel element of claim 1 in which the fuel material restraining member is a helical member and the helical member is comprised of stainless steel.

9. A nuclear fuel element of claim 1 in which the elongated container is comprised of a metal selected from the class consisting of zirconium, zirconium alloys, stainless steel, aluminum, aluminum alloys, niobium, niobium alloys and magnesium alloys.

10. A nuclear fuel element of claim 1 in which the nuclear fuel material is selected from the group consisting of uranium compounds, plutonium compounds, thorium compounds and mixtures thereof.

11. A nuclear fuel element of claim 1 in which the nuclear fuel material is comprised of uranium dioxide.

12. In a method for producing a nuclear fuel element, the improvement which comprises partly filling a clad container with nuclear fuel material leaving a cavity at one end which is open, inserting a helical member into said cavity, inserting into said cavity a multiplicity of strips of a gettering material for water, water vapor and reactive gases comprised of a ternary alloy, the alloy being comprised of from about 3 to about 12 weight percent nickel, of greater than 3 to about 30 weight percent titanium and the balance is zirconium, applying an end closure to the end of the clad container leaving the cavity in communication with the nuclear fuel, and then bonding the end of the clad container to said end closure to form a tight seal therebetween, whereby said ternary alloy is exposed to water, water vapor and reactive gases within the clad container.

13. A method according to claim 12 in which the ternary alloy has an intermetallic nickel-containing phase.

14. A method according to claim 12 in which the ternary alloy is comprised of about 4 weight percent nickel, about 11 weight percent titanium and the balance is zirconium.

15. A method according to claim 12 in which the ternary alloy is comprised of about 12 weight percent nickel, about 11 weight percent titanium and the balance is zirconium.

16. A method according to claim 12 in which the ternary alloy is comprised of about 10 weight percent titanium, 5 weight percent nickel and the balance is zirconium.

17. A method according to claim 12 in which the container is metallic.

18. A method according to claim 12 in which the multiplicity of strips is inserted into the helical member.

* * * * *